United States Patent Office 3,411,308
Patented Nov. 19, 1968

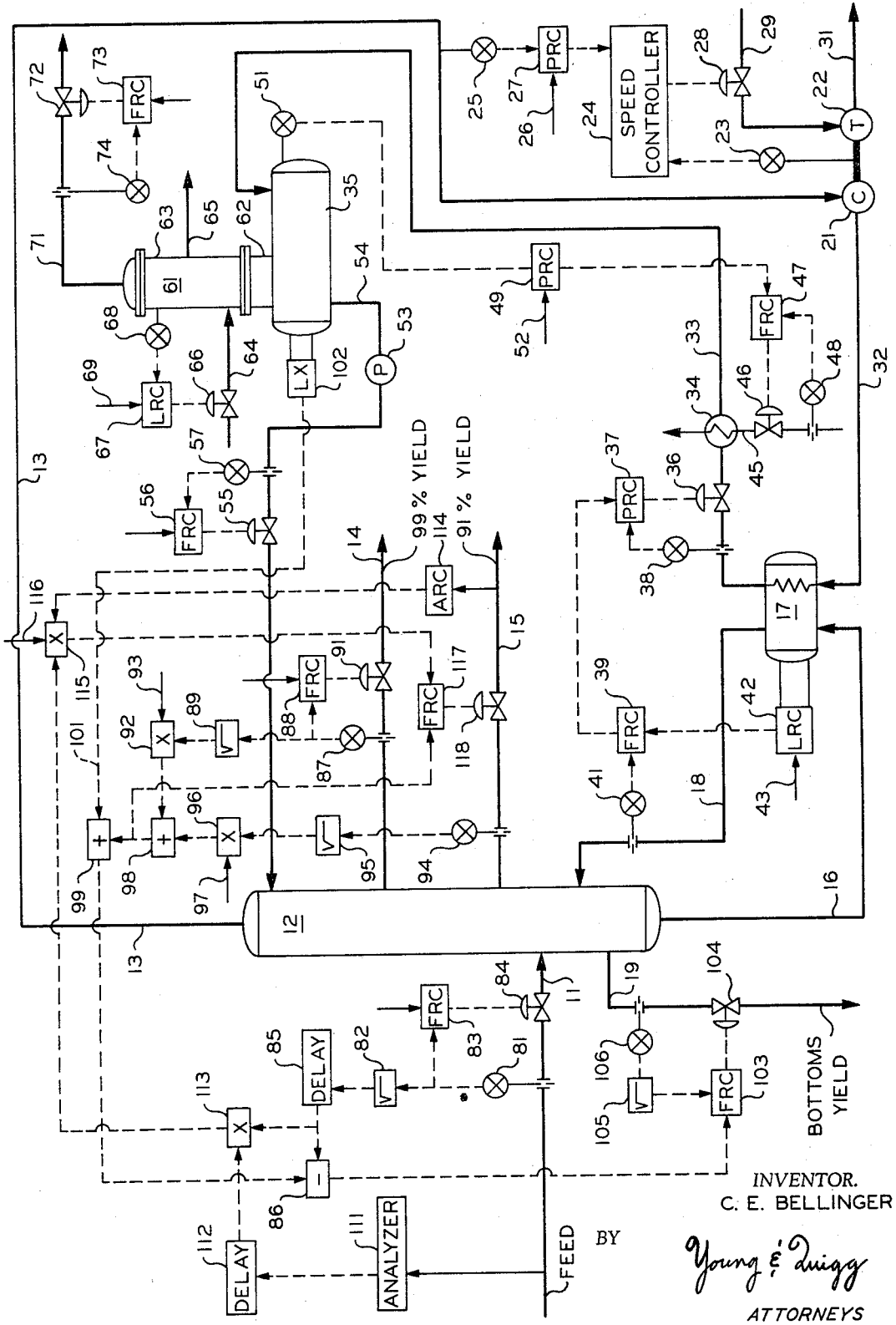

3,411,308
METHOD AND APPARATUS FOR CONTROLLING BY A MATERIAL BALANCE THE BOTTOMS FLOW RATE IN A FRACTIONAL DISTILLATION SYSTEM
Carnot E. Bellinger, Old Ocean, Tex., assignor to Phillips Petroleum Company, a corporation of Delaware
Filed Jan. 3, 1967, Ser. No. 606,677
8 Claims. (Cl. 62—21)

ABSTRACT OF THE DISCLOSURE

The flow rate of a bottoms product stream from a fractionator is regulated responsive to the difference between a delayed function of the flow rate of the feed and the sum of the flow rates of the remaining product streams. The overhead product flow rate signal is a bias value or the output of liquid level controller on the overhead accumulator instead of an actual flow measurement. The flow rate of a medium purity side draw stream is manipulated responsive to the difference between a signal representing a computed yield of the component of interest and a signal representing measured yield.

Background of the invention

This invention relates to method and apparatus for controlling a fractional distillation system. In one aspect the invention relates to the control of a fractional distillation column having a high purity side draw stream, a medium purity side draw stream, a very minor overhead stream and a bottoms product stream wherein the flow rate of the bottoms product stream is varied responsive to a predicted value representing the portion of the feed which is not removed from the column by way of the side draw streams. In another aspect the invention relates to varying such predicted value responsive to the liquid level in the overhead accumulator to account for changes in inventory resulting from various factors not specifically accounted for in the primary control. In yet another aspect the invention relates to the control of the medium purity side draw stream to provide an efficient yield or recovery of a component of interest.

In the past it has been customary to control the medium purity side draw stream with a flow controller having its set point adjusted by an analyzer-controller. However, difficulties have been encountered in closing and maintaining the control loop containing the analyzer-controller. One possible reason for such difficulties would be an inability of the column to maintain an inventory balance. In some systems an attempt would be made to maintain an inventory balance by having a liquid level controller on the overhead accumulator manipulate the set point of the flow controller which governed bottoms product yield. In such a system, a change in the flow rate of one of the side draw streams would cause a change in the accumulator level, which in turn would adjust the bottoms yield to maintain a system inventory balance. This system, because of high reflux-to-feed ratio and the large liquid volumes in the tower, accumulator and reboilers, would often be so slow that only a poor quality of control would result. In other systems the liquid level controller would be employed to adjust the flow controller which would regulate external reflux. This would adversely affect the reflux-to-feed ratio and the purity of both the high purity side draw stream and the medium purity side draw stream.

Summary of the invention

In accordance with the invention, it has been discovered that the difficulties with and the shortcomings of the prior systems can be significantly reduced by controlling the bottoms product flow rate responsive to a comparison of the total flow rate of the two side streams and a delayed function of the feed flow rate. It has also been found that such control can be further improved by adding to the sum of the flow rates of the side streams a signal responsive to the liquid level in the overhead accumulator. In a presently preferred embodiment of the invention, the control is further improved by manipulating the flow rate of the medium purity side draw stream responsive to a comparison of signals representing computed yield and measured yield.

Accordingly, it is an object of the invention to provide improved method and means for controlling a fractional distillation column. It is an object of the invention to provide an improved method and means of maintaining an inventory balance in a fractional distillation column. It is a further object of the invention to provide an improved yield control for a distillation column. Other objects, aspects and advantages of the invention will be apparent from a study of the specification, the drawing and the appended claims to the invention.

Brief description of the drawing

The single drawing is a diagrammatic representation of a fractional distillation system incorporating a presently preferred embodiment of the invention for upgrading the concentration of a component of the feedstock which has a volatility intermediate the volatilities of the lowest boiling and highest boiling components of the feedstock wherein the lowest boiling component is present in the feedstock in a low concentration.

Description of the preferred embodiment

While the invention is applicable to many different fractional distillation and other vapor-liquid separation systems, for purposes of simplicity it will be described in terms of a system for the separation of a feedstock comprising ethane, propylene and propane as the highest volatility component, intermediate volatility component, and lowest volatility component, respectively. It is recognized that minor impurities may also be present. A feed stream of ethane, propylene and propane is passed through conduit 11 into a fractional distillation column 12 and fractionally distilled therein. An overhead vapor stream is withdrawn from fractional distillation column 12 by way of conduit 13 while a high purity product stream enriched in propylene is withdrawn by way of side draw conduit 14 and a medium purity product stream enriched in propylene is withdrawn by way of side draw conduit 15. A liquid stream is withdrawn from the bottom of fractional distillation column 12 by way of conduit 16 and is introduced into reboiler 17 wherein the withdrawn liquid is subjected to indirect heat exchange to effect vaporization of the liquid. The reboiled stream thus produced is withdrawn from reboiler 17 and passed by way of conduit 18 into the lower portion of column 12, preferably below the lowest tray. A stream containing substantially all of the propane and only a small portion of the propylene introduced by the feed is withdrawn from the bottom section of column 12 by way of conduit 19 and is passed to a point of utilization, recovery, or further treatment.

The overhead vapor stream in conduit 13 is subjected to compression in a compressor 21, which is driven by suitable means such as a turbine 22. The rotational speed of turbine 22, and thus that of compressor 21 is measured by a tachometer 23 and the output signal thereof is applied to an input of speed controller 24. The pressure of the gas in conduit 13, as measured by a pressure transducer 25, is compared with set point 26 representing the desired pressure by pressure recorder controller 27. The output signal of pressure controller 27 is applied to the set point input of speed controller 24. Controller 24 compares the actual speed of the turbine against its set point value and adjusts valve 28 in conduit 29 which supplies steam to turbine 22, the exhausted steam leaving the turbine by way of conduit 31. The manipulation of valve 28 by controller 24 thus varies the flow rate induced by compressor 21 so as to maintain the pressure in conduit 13 and fractionator 12 substantially constant at the predetermined, desired value represented by set point 26.

The resulting hot, vaporous, compressed stream is passed by way of conduit 32 through reboiler 17 in indirect heat exchange with the kettle contents contained therein. The cooled fluid stream is withdrawn by way of conduit 33 and passed through a heat exchanger 34 and into the overhead accumulator 35. Valve 36, located in conduit 33, is manipulated by pressure recorder controller 37 responsive to a comparison of the actual pressure in conduit 33 as sensed by a pressure transmitter 38 and the output signal of flow recorder controller 39. The output signal of flow recorder controller 39, which is applied to the set point input of controller 37, is produced responsive to a comparison of the rate of flow of the vaporous stream through conduit 18, as indicated by flow transmitter 41, and the output signal of liquid level recorder controller 42. Liquid level controller 42 is operatively mounted on reboiler 17 and produces an output signal responsive to a comparison of a set point value 43 with a signal representing the actual level of liquid kettle material in reboiler 17. Thus, flow controller 39 regulates the flow of vaporous material through conduit 18 by manipulating the pressure of the vaporous compressed stream from conduit 32 passing through reboiler 17. Liquid level controller 42 readjusts the desired flow of vaporous material through conduit 18 to maintain the liquid level of kettle material in reboiler 17 substantially constant. A suitable coolant is passed by way of conduit 45 into and through heat exchanger 34 in indirect heat exchanging relationship with the fluid contents of conduit 33. Valve 46, located in conduit 45, is manipulated by flow recorder controller 47 responsive to a comparison of the actual flow rate through conduit 45, as indicated by flow transmitter 48 and its set point value which is adjusted by pressure recorder controller 49 responsive to a comparison of the pressure in accumulator 35, as indicated by pressure transmitter 51 and its set point value 52. Indirect heat exchanger 34 thus serves as a trim cooler to maintain the pressure in accumulator 35 substantially constant at the desired value represented by set point 52. The hot vaporous stream from conduit 32 is substantially condensed by its passage through reboiler 17 and heat exchanger 34 to produce a condensate and an uncondensed gas enriched in ethane. The condensate is withdrawn from accumulator 35 and is passed by way of pump 53 and conduit 54 into an upper portion of column 12 as reflux therefor. The rate of flow of reflux through conduit 54 is controlled by a valve 55 which is in turn manipulated by a flow recorder controller 56 responsive to a comparison of the differential pressure across an orifice as transmitted by transducer 57 in conduit 54 and the set point value applied to controller 56.

A self-refluxing gas absorber 61 is connected to the vaporous section of accumulator 35 and comprises a contactor section 62 and a refrigeration section 63. A vapor stream is withdrawn from accumulator 35 and passed into contactor section 62 wherein the ascending vapor is contacted with descending liquid from refrigeration section 63. A suitable refrigerant is passed by way of conduit 64 into indirect heat exchanging relationship with refrigeration section 63 and is withdrawn therefrom by way of conduit 65. Valve 66, located in conduit 64, is manipulated by liquid level controller 67 responsive to a comparison of the actual level of refrigerant in refrigeration section 63, as indicated by liquid level transducer 68, and the set point 69 of controller 67. Valve 66 thus manipulates the rate of flow of liquid refrigerant into the refrigeration section to maintain the liquid level of refrigerant in refrigeration section 63 substantially constant at the value represented by set point 69. Any remaining uncondensed gas is withdrawn from refrigeration section 63 and passed by way of conduit 71 and valve 72 to vent, recovery, or further treatment. Valve 72 is manipulated by flow recorder controller 73 to maintain the flow rate through conduit 71 as measured by transducer 74 substantially constant at a desired, relatively low value.

The differential pressure across an orifice in conduit 11 is transmitted by transducer 81 to square root extractor 82 to produce a signal representative of the total flow rate of feed through conduit 11. If desired, the signal representative of the orifice differential pressure from transducer 81 can be applied to the signal input of a flow recorder controller 83 for the purpose of manipulating valve 84 to maintain such flow rate substantially constant. The output of square root extractor 82 is passed through a delay means 85 to a subtractor 86. Delay means 85 has a delay function substantially equivalent to the process delay encountered in the passage of fluid material through fractional distillation column 12. A signal representative of the conduit 14 orifice differential pressure from transducer 87 is applied to the signal input of a flow recorder controller 88 and also to the input of a square root extractor 89. Flow controller 88 manipulates valve 91, located in conduit 14, to maintain the flow rate of high purity propylene product passing therethrough substantially constant. The output of square root extractor 89 is applied to an input of multiplier 92 wherein it is multiplied by the calibration factor 93 so that a unit of the analog signal from the multiplier 92 represents the same liquid volume flow rate as a unit of the analog signal from square root extractor 82. A signal representative of the differential pressure across an orifice located in conduit 15 is applied from transducer 94 to the input of square root extractor 95. The output of square root extractor 95 is applied to one input of multiplier 96 wherein it is multiplied by a calibration factor 97 so that its output signal is similarly related to that from square root extractor 82 as is the signal from multiplier 92. The outputs of multipliers 92 and 96 are applied to inputs of an adder 98 wherein the signals are summed to produce a signal representative of the total flow rate of material through side draw stream conduits 14 and 15. The output of adder 98 is applied to an input of adder 99 wherein it is summed with a bias signal 101 representing the loss of material through overhead conduit 71 and any other factor affecting the control. In the presently preferred embodiment, bias signal 101 is the output of a liquid level transducer 102 located on overhead accumulator 35. The output of adder 99, which represents the totalized rate of withdrawal of fluid material streams from column 12 other than bottoms product conduit 19, is applied to one input of subtractor 86 wherein it is subtracted from the output of delay means 85. The output of subtractor 86 which represents the predicted value of bottoms product flow rate required to maintain a material balance around fractionator 12, is applied as the set point input to flow recorder controller 103. Controller 103 manipulates valve 104 in conduit 19 responsive to a comparison of its set point value and the output of square root extractor 105, the input of square root extractor 105 being connected to a differential pressure transducer 106 operatively connected across an orifice located in conduit 19. The foregoing control provides for the regulation of the bottoms product flow rate responsive to the value predicted to be necessary to maintain the material balance throughout the fractionation system. The delay means 85 produces a delay in the output of square root extractor 82 corresponding to the delay which the feed experiences in passing from conduit 11 through the fractionation column 12 into side draw stream conduits 14 and 15.

A sample of the feed from conduit 11 is passed into an analyzer 111 which produces an output signal representative of the concentration of propylene in the feed stock. The output of analyzer 111 is passed through a delay means 112 to an input of multiplier 113. Delay means 112 introduces a delay function into the analyzer output corresponding to the process delay encountered in the fractional distillation column 12. The output of delay means 85 is applied to a second input of multiplier 113 to produce an output signal representative of the flow rate of propylene in the feed passing through conduit 11. This signal can be said to represent the computed desirable yield of propylene. However, as a small amount of propylene is lost in the bottoms product stream and the overhead product stream, and as the side draw streams contain propane in addition to the propylene, this computed yield cannot be obtained exactly in practice. The flow rate of the high purity propylene stream withdrawn by way of conduit 14 is maintained constant by flow recorder controller 88. The purity of this stream is determined to a large extent by the reflux-to-feed ratio. With the feed flow rate being maintained constant by flow controller 83 and the reflux flow rate being maintained constant by flow controller 56, the purity of the stream being withdrawn through conduit 14 will remain substantially constant. In one particular application, the concentration of propylene in this stream is maintained at substantially 99 percent while the concentration of propylene in stream 15 is desirably approximately 91 percent. The purity of the medium purity propylene stream withdrawn by way of conduit 15 is more significantly affected by variations in column conditions. Thus it is desirable that a measurement be made of the purity of stream 15 and that the variations from a desired purity be utilized as a feedback signal to correct the computed yield output signal of multiplier 113. This is accomplished by an analyzer recorder controller 114 which is operatively connected to conduit 15 for determining the concentration of propylene therein. In a particular application wherein the composition of the stream being withdrawn by way of conduit 15 is essentially propylene and propane, the concentration of the propylene can be determined more accurately by analyzing the fluid for propane concentration, as a change in the composition is more significantly reflected in the percentage propane than in the percentage propylene due to the high concentration of propylene. Analyzer controller 114 produces an output signal representative of the variation in the composition of the fluid passing through conduit 15 from a desired value represented by the set point to controller 114. The output from controller 114 is applied to one input of multiplier 115 while the output from multiplier 113 is applied to a second input of multiplier 115. A bias signal 116 is applied to a third input of multiplier 115 to introduce the proper coefficient value. The output of multiplier 115, which represents the corrected computed yield, is then applied to the set point input of flow recorder controller 117. The output of adder 98, which represents a function of the actual yield, is applied to the measurement input of controller 117. Controller 117 manipulates valve 118 located in conduit 15 to regulate the flow rate of medium purity product through conduit 15 to maintain the measured yield substantially equal to the corrected computed yield.

The following example is presented in further illustration of the invention and should not be construed to unduly limit the invention. A fractional distillation system, for the production of a high purity propylene product containing at least 99 volume percent propylene and a medium purity propylene product containing approximately 91 volume percent propylene from a feed stream containing ethane, propylene and propane at a feed rate of about 164 barrels per hour is schematically represented by the drawing and is operated under the following conditions:

EXAMPLE

|  | Pressure, p.s.i.g. | Temperature, °F. |
|---|---|---|
| Feed stock | 100 | 45 |
| Column 12, overhead | 83 | 38 |
| Compressor 21, discharge | >135 | >93 |
| Accumulator 35 | 135 | 64 |
| Conduit 71 | 133 | 15 |
| Conduit 16 | 91 | 53 |
| Conduit 18 | 91 | 56 |

The reflux flow rate in conduit 54 is approximately 1780 barrels per hour.

The process streams have the following compositions:

| Stream | 11 | 71* | 14 | 15 | 19 |
|---|---|---|---|---|---|
| Component, bbls./hr.: | | | | | |
| Ethane | 0.5 | 0.5 | | | |
| Propylene | 110.5 | 0.5 | 39.6 | 69.2 | 1.2 |
| Propane | 51.0 | | 0.4 | 6.8 | 43.8 |
| Other | 2.0 | | | | 2.0 |
| | 164.0 | 1.0 | 40.0 | 76.0 | 47.0 |

*Vapor stream. Values given are as equivalent liquid.

Reasonable variations and modifications are possible within the scope of the foregoing disclosure, the drawing, and the appended claims to the invention. While the invention has been disclosed in the terms of an analog computer utilizing pneumatic components, it is within the contemplation of the invention to utilize an analog computer incorporating electrical components or a combination of electrical and pneumatic components. It is also within the contemplation of the invention to perform the computations required by the control system on a digital computer. It is obvious that the same control can be effected with various rearrangements of the operations of the computer. Thus, a single physical component can be utilized to perform the multiplication of multiplier 92 and the summation of adder 98. Similarly, adder 99 and subtractor 86 can be combined. Other variations will be obvious to those skilled in the art to which the invention pertains.

What is claimed is:

1. A process for the distillation of a multicomponent feedstock containing a high volatility component, an intermediate volatility component and a low volatility component comprising introducing said feedstock into a fractional distillation zone and fractionally distilling said feedstock therein; withdrawing an overhead vaporous stream from said fractional distillation zone; at least partially condensing said overhead vaporous stream to form liquid condensate; returning at least a portion of said condensate to an upper portion of said fractional distillation zone as reflux therefor; withdrawing an uncondensed portion of said overhead vaporous stream as an overhead product; withdrawing from said fractional distillation zone a first side draw stream having a high concentration of said intermediate volatility component; withdrawing from said fractional distillation zone a second side draw stream having a lower concentration of said intermediate volatility component than said first side draw stream; withdrawing a kettle product stream from a lower portion of said fractional distillation zone; wherein the improvement comprises establishing a first signal representative of a delayed function of the flow rate of said feedstock; establishing a second signal representative of the sum of the flow rate of said first side draw stream, the flow rate of said second side draw stream, and a bias value; establishing a third signal representative of the difference between said first signal and said second signal; and manipulating the rate of flow of said kettle product responsive to said third signal.

2. A process in accordance with claim 1 wherein the step of partially condensing said overhead vaporous stream comprises compressing said overhead vaporous stream wherein the compressed stream becomes heated, withdrawing liquid kettle material from said fractional distillation zone, indirectly heating the thus withdrawn kettle material with said heated compressed stream in an indirect heat exchange zone whereby at least a portion of the kettle material becomes vaporized and the compressed stream becomes cooled and partially condensed, promoting vapor flow from the lower portion of said fractional distillation zone upwardly through said fractional distillation zone by introducing the thus vaporized kettle material into said lower portion of said fractional distillation zone, passing said cooled and partially condensed compressed to an accumulator zone, withdrawing liquid condensate from said accumulator zone as the source of said reflux, withdrawing uncondensed gas from said accumulator zone as a source of said overhead product, and establishing said bias value as a function of the liquid level of fluid condensate in said accumulator zone.

3. A process in accordance with claim 2 wherein said lowest volatility component is propane, said intermediate volatility component is propylene, and said highest volatility component is ethane.

4. A process in accordance with claim 2 further comprising establishing a fourth signal representative of the flow rate of said intermediate volatility component entering said fractional distillation zone by way of said feedstock, establishing a fifth signal representative of the concentration of said intermediate volatility component in said second side draw stream, establishing responsive to said fourth and fifth signals a sixth signal representative of a computed yield, establishing a seventh signal representative of the total flow rates of said first and second side draw stream, and manipulating responsive to a comparison of said sixth and seventh signals the flow rate of said second side draw stream.

5. A process in accordance with claim 4 further comprising maintaining the flow rates of said feedstock and said first side draw stream substantially constant.

6. Apparatus comprising a fractional distillation column, first conduit means for introducing a feedstock into said fractional distillation column, second conduit means connected to the upper portion of said fractional distillation column for withdrawing a vaporous overhead stream, third conduit means connected to an upper portion of said fractional distillation column for withdrawing a first side draw stream therefrom, fourth conduit means connected to an intermediate portion of said fractional distillation column for withdrawing a second side draw stream therefrom, fifth conduit means connected to a lower portion of said fractional distillation column for withdrawing a kettle product therefrom, wherein the improvement comprises means for producing a first signal representative of the flow rate of feedstock through said first conduit means, means for producing a second signal representative of a delayed function of said first signal, means for producing a third signal representative of the flow rate of said first side draw stream through said third conduit means, means for producing a fourth signal representative of the flow rate of said second side draw stream through said fourth conduit means, means for establishing a biasing signal, means for producing a sixth signal representative of the difference between said second signal and the summation of said third, fourth and biasing signals, and means responsive to said sixth signal for manipulating the flow rate of said kettle product passing through said fifth conduit means.

7. Apparatus in accordance with claim 6 further comprising a reboiler, conduit means for passing liquid kettle material from the kettle of said fractional distillation column to said reboiler, conduit means for passing vapors produced by the vaporization of said liquid kettle material in said reboiler from said reboiler to a lower portion of said fractional distillation column, a compressor, conduit means for passing said vaporous overhead stream to an inlet of said compressor, an accumulator, conduit means for passing the heated, compressed vapors from an outlet of said compressor through said reboiler in indirect heat exchanging relationship with the kettle material within said reboiler and into said accumulator, conduit means for passing liquid condensate from said accumulator to an upper portion of said fractional distillation column as reflux therefor, means for withdrawing uncondensed gas from said accumulator as an overhead product, and wherein said means for establishing a biasing signal comprises means for establishing said biasing signal responsive to the level of liquid condensate in said accumulator.

8. Apparatus in accordance with claim 7 further comprising a first analyzer operatively connected to said first conduit means for measuring the concentration of a component of interest, a first flow sensor for measuring the flow rate of said feedstock through said first conduit means, means responsive to the outputs of said first analyzer and said first flow sensor for establishing a seventh signal representative of a delayed function of the flow rate of said component of interest through said first conduit means, a second analyzer operatively connected to said fourth conduit means for measuring the concentration of a component of interest in said second side draw stream and establishing an eighth signal representative thereof, means for multiplying said seventh and eighth signals to obtain a ninth signal, a flow controller having a set point input, a measurement input and an output, means for applying said ninth signal to said set point input of said flow controller, means for establishing a tenth signal representative of the total of the flow rates of said first and second side draw streams and applying said tenth signal to said measurement input of said flow controller, and valve means in said fourth conduit means being operated by said output of said flow controller.

References Cited

UNITED STATES PATENTS

| | | | |
|---|---|---|---|
| 2,893,927 | 7/1959 | Mertz et al. | 203—3 |
| 2,977,289 | 3/1961 | Kron | 203—3 |
| 2,990,437 | 6/1961 | Berger | 203—3 |
| 3,182,005 | 5/1965 | Lupter | 62—21 |
| 3,212,997 | 10/1965 | Walker | 203—2 |
| 3,225,550 | 12/1965 | Kelley et al. | 203—1 |
| 3,309,287 | 3/1967 | Lupter et al. | 203—1 |

WILBUR L. BASCOMB, JR., *Primary Examiner.*